United States Patent Office 3,459,780
Patented Aug. 5, 1969

3,459,780
ORGANOMETALLIC COMPOUNDS FORMED BY REACTIONS OF RHODIUM MONOHALIDE COMPOUNDS
Geoffrey Wilkinson, London, England, assignor to Ethyl Corporation, New York, N.Y., a corporation of Virginia
No Drawing. Filed Feb. 15, 1967, Ser. No. 616,207
Claims priority, application Great Britain, Feb. 21, 1966, 7,532/66
Int. Cl. C07f 15/00, 9/02, 9/66
U.S. Cl. 260—429     5 Claims

ABSTRACT OF THE DISCLOSURE

The rhodium monohalides having the formula

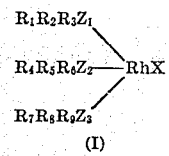

(I)

wherein $R_1$–$R_9$ are organic radicals either alike or different, preferably having six to ten carbon atoms, $Z_1$–$Z_3$ are either alike or different and selected from phosphorus, arsenic, and antimony, and X is a halogen, are reacted with alkyl halides, allyl halides, aldehydes, arylacyl halides, aliphatic acyl halides, hydrogen chloride, and oxygen, to yield novel compounds. The compounds of this invention find use as chemical intermediates, oxidation catalysts and metal plating compounds.

BACKGROUND OF THE INVENTION

Tris(triphenylphosphine)chlororhodium, as well as the corresponding arsine and stibine compounds, have outstanding properties as homogeneous hydrogenation catalysts for olefins or acetylenes. They are also known to be useful as hydroformylation and olefin isomerization catalysts. The chemistry of these compounds, however, has not been fully studied. The instant application, therefore, shows the further development of the chemistry of tris(triphenylphosphine)chlororhodium and its related arsine and stibine compounds.

SUMMARY OF THE INVENTION

The rhodium monohalides have the formula $$(R_3Z)_3RhX$$

(II)

wherein R is an aryl radical of six to ten carbon atoms, Z is alike or different and selected from phosphorus, arsenic, and antimony, but preferably phosphorus, and X is a halogen, preferably chlorine or bromine, and most preferably, chlorine. These compounds are reacted with alkyl halides to yield a compound having the formula $$(R_3Z)_2Rh^I(R')XX_1 \cdot R'—X_1$$

wherein R, Z and X are as described above, and R' is a lower alkyl radical having one to six carbon atoms. Said rhodium monohalides may also be reacted in solution with hydrogen chloride to yield corresponding hydrido species. Finally, when the rhodium monohalides are reacted with oxygen in the presence of dichloromethane, a compound having the following formula is obtained:

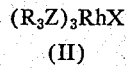

DESCRIPTION OF THE DISCLOSURE

The rhodium monohalides which are used in the processes of this invention have Formula I shown above. However, in the preferred embodiment, the compounds having Formula II are used. An important feature of these compounds is that the rhodium is in the unipositive valence state.

To prepare the compounds of Formula I or II, it is only necessary to contact the appropriate phosphine, arsine, stibine or mixture thereof with a rhodium halide wherein the rhodium is in the tripositive state. For the resultant complex having a unipositive rhodium to occur, reduction of the rhodium within the trivalent halide must take place. Hence, a material to be oxidized must be present in the reaction system. The material to be oxidized can be an excess of phosphine, arsine, or stibine reactant. In other words, a reaction of excess phosphine, arsine or stibine (or a mixture thereof) with a rhodium trihalide yields a monohalide of Formula I or II. Thus, more than three, but usually not more than ten, moles of phosphine, arsine or stibine is used per each mole of rhodium (III) halide.

Preferred reaction temperatures are from about −5° to about 100° C. More preferably, temperatures are within the range of 40–85° C. Ambient pressures can be used; the reaction pressure (like the temperature) is not critical. Usually subatmospheric pressures offer no material advantage. Elevated pressures of up to 50 or about 100 atmospheres can be employed if desired. Elevated pressures are especially effective when it is desired to use a reaction temperature above the normal point of a solvent employed. Lower alkanols, that is, monohydric alcohols having 1 to 4 carbon atoms, are preferred reaction solvents. These are exemplified by methanol, ethanol, isopropanol, n-butanol and the like. Usually the reaction is completed in front about one minute to 24 hours. Preferably, reaction times are less than 10 hours. The reaction can be carried out under a blanket of an inert gas like nitrogen; however, it is not necessary to do so. The following example illustrates the preparation of the starting materials used in the processes of this invention.

Triphenylphosphine (which was freshly recrystallized from ethanol), 12 parts, was dissolved in about 280 parts of hot ethanol. Another solution consisting of 56 parts of hot ethanol and two parts of rhodium trichloride trihydrate was also prepared. The two solutions were mixed and the resultant reaction mixture refluxed for 30 minutes. The hot solution was filtered and burgundy-red crystals were obtained. The crystals were washed with two portions of 35 parts of diethyl ether and then dried in vacuum.

The crystals were the product, tris(triphenylphosphine) rhodium (I) chloride, M.P. 157–158° C. Analysis indicated: C, 70.1; H, 4.9; Cl, 4.3. $C_{56}H_{45}ClP_3Rh$ requires: C, 70.1; H, 4.9; Cl, 3.8. The total yield of product isolated was 6.25 parts; i.e., 85 percent based on rhodium.

If more concentrated solutions are used; that is, 160 parts or less of ethanol in total, orange crystals of the product rhodium complex are obtained at once on refluxing. On continued refluxing, gradual conversion of these orange crystals to the normal deep red form occurs.

In a similar manner, a reaction of two moles of triphenylphosphine, two moles of triphenylarsine, and two moles of triphenylstibine with one mole of rhodium trichloride yields a mixture of tris(triphenylphosphine)rhodium (I) chloride, tris(triphenylarsine)rhodium (I) chloride, tris(triphenylstibine)rhodium (I) chloride, triphenylphosphine bis(triphenylarsine)rhodium (I) chloride, triphenylarsine bis(triphenylphosphine)rhodium (I) chloride, triphenylarsine bis(triphenylstibine)rhodium (I) chloride, triphenylstibine bis(triphenylstibine)rhodium (I) chloride, triphenylstibine bis(triphenylarsine)rhodium (I) chloride, triphenylstibine bis(triphenylphosphine) rhodium (I) chloride, (triphenylphosphine)(triphenylarsine)(triphenylstibine)rhodium (I) chloride, and triphenylphosphine bis(triphenylstibine)rhodium (I) chloride. Similar bromine compounds are prepared by using rhodium tribromide in place of rhodium trichloride.

This invention is related to previous inventions described in my copending United States application Ser. No. 514,118, filed Dec. 15, 1965. The disclosure of the previously filed application is included by reference herein as if fully set forth.

The materials below discuss the various processes within this invention.

I. *Reaction with alkyl halides.*—A preferred embodiment of this process is a method for the preparation of a compound having the formula $$(R_3Z)_2Rh^I(R')XX_1 \cdot R'-X_1$$

(III)

wherein R, X and Z are as defined above, and R' is a lower alkyl radical having 1 to 6 carbon atoms; said method comprising reacting a compound of Formula II with a compound having the formula R'—$X_1$.

This process can be carried out at a temperature of from about 18° to about 80° C., preferably from 20° to 45° C. The reaction pressure is not critical; ambient pressures can be used and are preferred. If desired, higher or lower pressures, 0.1 to 100 atmospheres, can be employed. The reaction time is usually within the range of from one minute to two hours.

It is only necessary to contact the reactants, thus, a solvent is not necessary. However, an inert solvent can be used if desired. Any solvent (which is inert to the starting material and products) such as a hydrocarbon like benzene, toluene, and petroleum ether is suitable.

Two moles of alkyl halide react with each mole of rhodium monohalide starting material. It is not necessary to use this mole ratio and an excess of either reactant can be employed. Usually the alkyl halide reactant R'—$X_1$ is cheaper than the rhodium monohalide starting material. Hence, an excess of the alkyl halide is preferred. Therefore, from two, and preferably three, to about 10 or more moles of alkyl halide per mole of a rhodium monohalide are employed. If a liquid, the excess alkyl halide, serves as a reaction medium.

Preferred alkyl halides are the bromides and iodides, the iodides being especially preferred. Preferably, the alkyl portion of the alkyl halide is solely composed of carbon and hydrogen; however, inert substituents may be present. In a most preferred embodiment, the alkyl portion is a straight rather than branched chain radical.

Phosphines of Formula II are the most preferred rhodium monohalides; however, arsines, and stibines can be used. Of the latter two types of compounds, the arsines are preferred. Preferably, the halogen within the rhodium monohalide starting material is chlorine or bromine; chlorine being more preferred.

Thus, when methyl iodide was reacted at room temperature with tris(triphenylphosphine)rhodium (I) chloride, the product $$[(C_6H_5)_3P]_2Rh^I(CH_3)(Cl)(I) \cdot CH_3-I$$

was obtained.

The green crystals of the product fall out of the reaction mass. They can be recrystallized from benzene. This reaction requires no exact proportions of reactants. If desired, it can be carried out at somewhat elevated temperatures, for example, up to the boiling point of methyl iodide. The reaction is essentially quantitative. Similar results are obtained if benzene or toluene is used as a solvent. The product is green and monomeric. Proton n.m.r. data indicate two chemically different methyl groups; one being directly bonded to the rhodium, one being within a solvated methyl iodide molecule. Although not bound by any theory, the product is believed to have the structure of Formula IV below or an isomer thereof.

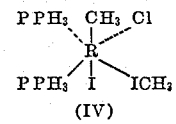

(IV)

In a similar manner, analogous corresponding products are obtained when from three up to ten moles of methyl bromide, ethyl iodide, n-butyl iodide, isobutyl iodide, or n-hexyl iodide are reacted with tris(triphenylphosphine) rhodium (I) chloride or bromide. Similar products are obtained when the analogous tolyl, xylyl, and butylphenyl phosphine compounds are used as starting materials. When the aforementioned alkyl halides are reacted with tris(triphenylarsine)rhodium (I) chloride and tris(triphenylstibine)rhodium (I) chloride, analogous products are obtained.

II. *Reaction with allyl halides.*—With allyl halides, the compounds of Formulas I or II yield the first well-defined allyl derivatives of rhodium. Both sigma and pi-complexes are prepared and these compounds comprise a preferred embodiment of this invention. Highly preferred compounds are the sigma and pi complexes having the formula

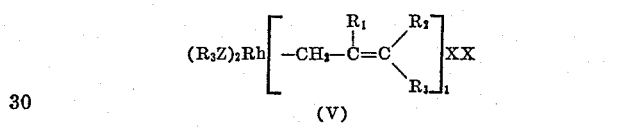

(V)

wherein R is an aryl radical having 6 to about 10 carbon atoms, Z is an atom of a Group V–A element as previously described, and $R_1$, $R_2$, and $R_3$ are alike or different and selected from the group consisting of hydrogen and lower alkyl radicals having one to 6 carbon atoms, and X and $X_1$ are halides selected from the class consisting of chlorine, bromine, and iodine.

These compounds are prepared by reacting a compound of Formula II with an allyl halide having the formula

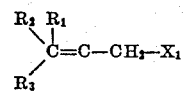

wherein $R_1$–$R_3$ and $X_1$ are as described above.

A wide vareity of allylic halides can react with carbon monoxide according to the process of this invention. Thus, any allylic halide which (1) is stable under the reaction conditions employed, (2) contains a free allylic halide radical having the formula

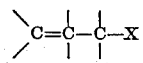

(X=halogen) as a reactive group, and (3) does not contain substituent groups which hinder or retard the process of this invention by undergoing competitive side reactions, are applicable. A free allylic halide radical is not in such juxtaposition with other radicals or groups that it is incapable of reacting as an allylic group because of a perturbation of its electronic structure by the neighboring radicals or groups.

Preferred allylic halides which meet the above criteria have the formula:

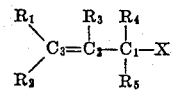

wherein X is a halongen preferably chlorine or bromine, and $R_1$, $R_2$, $R_3$, $R_4$ and $R_5$ independently selected from the class consisting of hydrogen and univalent organic radicals selected from the class consisting of alkyl, cycloalkyl, aralkyl, alkenyl, aryl, and alkaryl radicals having up to about 13 carbon atoms, such that the number of carbon atoms in said allylic halide does not exceed about 20.

Allylic halides having up to about 20 carbon atoms are preferred since, in general, they are more readily available. However, it is clear that no exact critical limitation of the number of carbon atoms exists. Consequently, allylic halides having more than 20 carbon atoms, say 30 or more, can be employed in the process. Illustrative examples of allylic halides are allyl bromide, allyl chloride, and allyl iodide, 4-chlorobutene-2, 6-iodohexene-4, 6-bromo-2 - methylhexene-4, 10 - chlorodecene-8, 15-bromopentadecene-13; 20-chloroeicosene-18, and the like.

This process can be carried out at a temperature of from about 18° to about 70° C., preferably from 20° to 45° C. The reaction pressure is not critical. Hence, pressures within the range of 0.1 to 100 atmospheres can be employed; ambient pressures are especially preferred. It is only necessary to contact the reactants, thus, a solvent is not necessary. Any solvent inert to the starting materials and products such as a hydrocarbon like benzene or petroleum ether can be used.

Preferred allyl halide starting materials are the chlorides and bromides, the chlorides being especially preferred. For this process, phosphines are the most preferred rhodium monohalides of Formula II. However, the arsines and stibines of that formula can be used.

Thus, when allyl chloride was reacted with tris(triphenylphosphine)rhodium (I) chloride, two products were isolated by crystallization from the reaction mixture.

Both products analyzed as

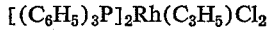

$[(C_6H_5)_3P]_2Rh(C_3H_5)Cl_2$

Proton n.m.r. data indicate that the allyl group is pi-bonded to rhodium in one compound and sigma bonded in the other. This reaction does not require any set proportion of reactants. It is essentially quantitative. The reaction is essentially complete in a few minutes. Excess allyl chloride serves well as a reaction medium; however, benzene, toluene, or the like can be used as a solvent. The two products can be separated from each other by fractional crystallization, chromatography or like technique known in the art.

Similar results are obtained when 2-methyl allyl chloride was reacted with tris(triphenylphosphine)rhodium (I) chloride.

When tris(triphenylphosphine)rhodium (I) chloride and the corresponding arsine and stibine derivatives are reacted with 1,2-dimethylallyl chloride, 2,3,3-trimethylallyl brromide, 1,1-dihexylallyl bomide, 1-(dodecryl)allyl chlorride, 2-cyclohexyallyl chloride and 2-(phenylethyl)allyl chloride, analogous products are obtained.

All of the sigma-bonded complexes which are formed by this process of he invention underrgo carbonylation reactions. The carbonylation can take place at a carbon monoxide pressurre of from one to about 50 atmospheres. Temperatures in the range of 15–60° C. can be employed. An inert solvent such as benzene, petroleum ether, ethanol or any other lower ethanol can be employed.

The carbonylated products have the formula

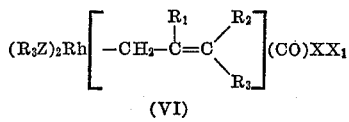

(VI)

when they are ultimately derived from a rhodium monohalide having Formula II. Although corresponding products can be obtained by reacting any of the compounds within Formula I, those prepared from monohalides having Formula II are preferred.

III. *Reaction with aldehydes.*—In this process, a compound having Formula I or II is reacted with an aldehyde whereby the aldehydic group is decarboxylated. In a preferred embodiment, the reaction is used to prepare alkanes of the Formula R'—H, wherein R' is a radical, preferably composed solely of carbon and hydrogen, which has up to 20 carbon atoms, said radical being selected from the class consisting of alkyl, cycloalkyl, and aralkyl groups. Of these, the alkyl groups are preferred. Aryl and alkaryl aldehydes having up to twenty carbon atoms can be used in this process. For example, when benzaldehyde is used, benzene is prepared. Similarly, 4-methylbenzaldehyde yields toluene, and 2-n-eicosylbenzaldehyde yields eicosylbenzene. Illustrative examples of other aldehydes that may be employed in this reaction are acetaldehyde, n-butyraldehyde, isobutyraldehyde, n-caproaldehyde, stearaldehyde, cyclopentane carboxaldehyde, cinnamaldehyde, and the like. The products are prepared by reacting the corresponding aldehyde with a rhodium monohalide of Formula I or II.

A wide variety of aldehydes undergo this process. It is only necessary that the aldehyde group to be decarbonylated be attached to a radical which does not interfere with this process by sterric hindrance or by undergoing an extraneous side reaction. Aldehydes having radicals of the type described above which are useful in this process are typified by acetaldehyde, valeraldehyde, n-eicosylaldehyde, cyclohexylaldehyde, 2-phenylacetaldehyde, and the like.

The reaction conditions generally are as follows.

(a) Temperature—usually from about 18° to about 50° C., preferably 20 to 40° C.

(b) Pressure—ambient preferred. However, higher or lower pressures as previously described can be used.

(c) Time—dependent somewhat on the other reaction conditions (e.g., temperature), usually from one minute to five hours, preferably less than two hours.

(d) Mole ratio of reactants—not critical, an excess of either reactant can be employed.

(e) Solvent—use not critical but benzene, toluene, and the like can be used.

Example 2 n-Valeraldehyde was reacted with tris(triphenylphosphine)rhodium (I) chloride. The product comprised a mixture of n-butane and bis(triphenylphosphine)rhodium (I) carbonyl chloride. The reaction proceeds well at ambient temperature. The butane is removable by distillation. The carbonyl product $[(C_6H_5)_3P]_2Rh(CO)(Cl)$ crystallizes from the reaction mixture. The reaction product contains some butene.

In a similar manner, benzaldehyde, 4-methylbenzaldehyde, laurylaldehyde, cyclohexylaldehyde, 2-phenylacetaldehyde, and eicosylaldehyde yield the corresponding hydrocarbons upon decarbonylation with tris(triphenylphosphine)rhodium (I) chloride, the corresponding bromide and the corresponding arsine and stibine compounds. When this reaction is carried out using aliphatic aldehydes of the type described above, the reaction mixture usually contains 10–15 percent of ethylenic material corresponding to the saturated alkane produced. Thus, acetaldehyde yields ethane and ethylene. As explained above, the rhodium monohalide employed is transformed into a corresponding rhodium carbonyl halide.

IV. *Reaction with arylacyl halides.*—In a preferred embodiment, this process prepares compounds having the formula

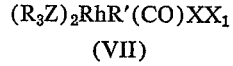

$(R_3Z)_2RhR'(CO)XX_1$ (VII)

wherein R and R' are aryl radicals independently selected from the class consisting of benzenoid hydrocarbon radicals having 6 to 10 carbon atoms, Z, X, and $X_1$ have the same significance as above. These compounds arise by the reaction of a rhodium monohalide of Formula II, with an acyl halide having the formula

$$R'-\overset{O}{\underset{\|}{C}}-X_1$$

wherein R' is an aryl radical of from 6 to about 10 carbon atoms and $X_1$ is selected from the class consisting of chlorine, bromine, and butylene; preferably $X_1$ is chlorine or bromine, most preferably chlorine.

The carbonyl halide group in the acyl halide may be bonded to any aryl radical which does not retard the process by steric hindrance or by undergoing an extraneous side reaction. However, because they are readily available, arylacyl halides of the type described above are preferred. Benzoyl chloride is a highly preferred reactant. Other acyl halide reactants derived from the tolyl, xylyl, cumenyl, butylphenyl or naphthyl radicals can be employed.

The reaction is easy to carry out. Usually the reaction conditions are as follows:

(a) Temperature—usually from about 15° to about 90° C., preferably 30° to 80° C.
(b) Pressure—ambient preferred. However, higher or lower pressures as previously described can be used.
(c) Time—dependent somewhat on the other reaction conditions, e.g., temperature, usually from one minute to six hours, preferably less than three hours.
(d) Mole ratio reactants—not critical, an excess of either reactants can be employed.
(e) Solvent—not critical but hydrocarbons and alkanols such as previously described can be used.

Benzoyl chloride, in refluxing benzene solvent, was reacted with tris(triphenylphosphine)rhodium (I) chloride. The product crystallized from the reaction medium. This reaction proceeds well when the acyl halide and the rhodium (I) chloride reactants are contacted in a mole ratio of 1:1. However, an excess of either reactant can be employed. Preferably, up to ten moles of acyl halide are used for each mole of rhodium monohalide. The product was a stable rhodium (III) complex having the formula $$[(C_6H_5)_3P]_2Rh(C_6H_5)(CO)Cl_2$$

Similarly, all the acyl halides specifically mentioned above, e.g., o-methylbenzyl chloride, p,n-butylbenzoyl chloride, and 2,3-dimethylbenzoyl chloride yield analogous products wherein the tolyl, butylbenzyl and xylyl radicals, respectively, are bonded to the rhodium atom.

V. *Reaction with aliphatic acyl halides.*—The reaction of aliphatic acyl halides with rhodium monohalides of Formula I or II can take two courses. These are illustrated by the reaction of acetyl chloride with tris(triphenylphosphine)rhodium (I) chloride.

When a quantity of tris(triphenylphosphine)rhodium (I) chloride is dissolved in acetyl chloride and the resultant reaction mass kept at ambient temperature for about one hour, the product is $$[(C_6H_5)_3P]_2RhCH_3(CO)(Cl_2)$$

This product is analogous to those obtained when an arylacyl halide is reacted, as discussed in the section of this specification immediately preceding this one.

When a quantity of tris(triphenylphosphine)rhodium (I) chloride is dissolved in boiling acetyl chloride, the products are $$[(C_6H_5)_3P]_2Rh(CO)Cl$$

and methyl chloride.

Under many temperature conditions the reaction of an acyl halide with a rhodium monohalide of Formula I or II will undergo both routes to some extent. However, it appears that in many cases, an appreciable amount of aliphatic chloride decarbonylation product is not obtained unless the temperature is at least 35°–40° C.

In summary there are two preferred embodiments of the reaction of aliphatic acyl halides with a compound of Formula I or II.

(A) A highly preferred embodiment comprises a process for the preparation of a compound having the formula $R'—X_1$ and a compound having the formula $$[R_3Z]_3Rh(CO)X$$

said process comprising reacting, at a temperature between 35° C. and about 150° C. a compound of Formula II with an acyl halide having the formula

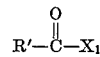

wherein $R'$ is a radical selected from the class consisting of alkyl, cycloalkyl radicals having up to about 8 carbon atoms, and X is a halogen, preferably chlorine and bromine.

(B) Another highly preferred embodiment comprises the reaction of an acyl halide of this type with a compound of Formula I, said process being carried out at a temperature of from about 15° to about 35° C., whereby the product obtained is a compound having the formula $$[(R_3Z)_2Rh(R')(CO)XX_1]$$

(VIII)

Typical acyl halides which undergo this reaction besides acetyl chloride, are acetyl bromide, propionyl chloride, n, iso-, sec-butyryl chlorides and homologues thereof having up to about 8 carbon atoms, as well as cyclohexylacetyl chloride and

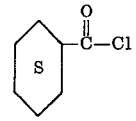

and the like.

These reactions do not require any set proportion of reactants and an excess of either can be employed. Like all the reactions of this invention, an excess of the reactant, other than the rhodium monohalide, can be used as a reaction medium when it is a liquid. Furthermore, like all of the reactions of this invention, these reactions can be carried out using stoichiometric quantities of the reactants.

The phosphines of Formula II are the most preferred monohalide rhodium reactants; however, the corresponding arsines and stibines can be used. Preferably, X in Formual II is chlorine.

VI. *Preparation of hydrido species and uses thereof.*— Chloroform solutions of compounds of Formula I or II, react with HCl gas to form the corresponding hydrido species. Thus, with compounds of Formula II, the products have the formula $(R_3Z)RhCHlX$. With HBr and HI, the corresponding bromide and iodide compounds are formed. This reaction is easy to carry out, it being only necessary to pass the gas through the chloroform solution at a temperature of from about 15° to about 30° C., preferably room temperature.

These hydrido species react in situ with alkynes such as $R'C \equiv CH$ and olefins such as $R'—CH=CH_2$ (wherein $R'$ is a hydrocarbon radical selected from the class consisting of alkyl, cycloalkyl, aralkyl, aryl, alkaryl and alkenyl groups of up to about 8 carbon atoms) to form the corresponding vinyl and ethyl derivatives of Rh (III). Thus, for example, acetylene and ethylene, respectively, yield the following products when reacted with tris(triphenylphosphine)rhodium (I) chloride:

(a) $\quad [(C_6H_5)_3P]_2Rh(—CH=CH_2)Cl_2$ (b) $\quad [(C_6H_5)_3P]_2Rh(—CH_2—CH_3)Cl_2$ These compounds are apparently five coordinate and are air stable. Additional illustrative examples of compounds which undergo this reaction are propylene, butene, isobutene, heptene-1, dodecene-1, butadiene, octadiene-1,3-dodecadiene-1,4, methylacetylene, pentyne-1, heptyne-1, hexyne-3, 3,3-dimethylbutyne-1, dodecyne-1, styrene, alkylbenzene, stilbene, phenylacetylene, phenylpentyne-1, phenylhexyne-3, and the like.

These reactions are very facile alkene and alkyne insertion reactions. They can be conducted in the presence of a solvent other than chloroform such as benzene or toluene. Stoichiometric quantities of reactants can be used, however, an excess of either reactants can be employed. Temperatures from 15° to about 60° C. are preferable.

At mild temperatures, —20° to 10° C., the ethyl derivatives (those formed from alkenes) react with carbon monoxide at a pressure of one to 50 or more atmospheres to yield the acyl derivative. At higher temperatures, the latter rearrange to form a carbonyl derivative and an alkyl halide.

Thus, the ethyl complex $$[(C_6H_5)_3P]_2Rh[-CH_2-CH_3]Cl_2$$

reacts with CO to yield $$[(C_6H_5)_3P]_2Rh[-\overset{O}{\overset{\|}{C}}-CH_2-CH_3]Cl_2$$

which at higher temperatures rearranges to form $$[(C_6H_5)_3P]_2Rh(CO)Cl$$

and ethyl chloride.

From this process, there are the following types of preferred compounds:

(IX) $(R_3Z)_2RhHXX_1$
(X) $(R_3Z)_2Rh(-CH=CHR')XX_1$
(XI) $(R_3Z)_2Rh(-CH_2-CH_2R')XX_1$
(XII) $(R_3Z)_2Rh[-\overset{O}{\overset{\|}{C}}-CH_2-CH_2R']XX_1$
(XIII) $(R_3Z)_2Rh(CO)(Cl)$ In these compounds, R is an aryl radical of 6 to 10 carbon atoms, R' is a hydrocarbon radical selected from alkyl, cycloalkyl, aralkyl, aryl, alkaryl and alkenyl radicals of up to about 8 carbon atoms, Z is phosphorus, arsenic or antimony, and X and $X_1$ are chlorine, bromine or iodine.

VII. *Reaction with oxygen.*—Dichloromethane solutions of compounds of Formula I or II take up oxygen (1 mole) at mild temperatures (about 15°–35° C.). Thus, with tris(triphenylphosphine)rhodium (I) chloride, light brown crystals of $[(C_6H_5)_3P]_2Rh(O_2)Cl\cdot0.5CH_2Cl_2$ are obtained. The oxygen can be replaced with other ligands, thus, at room temperature, and one atmosphere of carbon monoxide, the compound $$[(C H_5)_3P]_2Rh(CO)Cl$$

is obtained.

Other ligands such as $SO_2$, $CS_2$, and NO also react with the compounds of Formulas I and II.

The novel compounds described above are useful in many metal plating applications. In order to effect metal plating using the instant compounds, they are decomposed in an evacuated space containing the object to be plated. On decomposition, they lay down a film of metal on the object. The gasous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of the compound having the formula $[(C_6H_5)_3P]_2Rh^I(CH_3)Cl(I)\cdot CH_3$—I. The tube is heated at 400° C. for one hour after which time it is cooled and opened. The cloth assumes a uniform metallic appearance.

Some of my novel compounds are also useful as intermediates in the catalytic preparation of terminal, linear alkyl halides from olefins. For example, Compound II reacts with hydrogen chloride to yield Compound IX, which in turn reacts with a terminal olefin to produce Compound XI. The latter compound is reacted with carbon monoxide to give Compound XII which, on heating, produces a terminal alkyl halide and $(R_3Z)_2Rh(CO)X$. Alkyl halides are known to have many commercial utilities, such as in the preparation of amines, amine oxides, sulfonic acids, and the like, which are commercial products. The compound $(R_3Z)_2Rh(CO)X$ is reacted with triphenylphosphine to give Compound II, which again can be employed in the above-described cycle. Compounds having the formula $(R_3Z)_2Rh(O_2)X$ obtained by process VII described above are useful as oxidation catalysts, for example in converting oxyaldehydes to acids.

Having fully described the many novel compounds and the processes for preparing them, I wish this invention to be limited only within the lawful scope of the appended claims.

I claim:
1. A compound having the formula:

$$(R_3Z)_2Rh^I(R')XX_1\cdot R'-X_1$$

wherein R is an aryl radical of six to ten carbon atoms, Z is selected from the group consisting of phosphorus, arsenic, and antimony, R' is an alkyl radical having one to six carbon atoms, and X and $X_1$ are halogen atoms selected from the group consisting of chlorine, bromine and iodine.

2. A process for the preparation of the compound of claim 1, said process comprising reacting a compound having the formula $(R_3Z)_3RhX$, wherein R, Z and X are as defined in claim 1, with an alkyl halide having from one to six carbon atoms, said process being carried out at a temperature of from about 18 to about 80° C.

3. Compounds selected from the group consulting of $(R_3Z)_2RhHXX_1$,
$(R_3Z)_2Rh(-CH=CHR')XX_1$,
$(R_3Z)_2Rh(-CH_2-CH_2R')XX_1$, and $$(R_2Z)_2Rh\left[\overset{O}{\overset{\|}{C}}-CH_2-CH_2R'\right]XX_1$$

wherein R, R', Z, $X_1$ and X are as defined in claim 1.

4. A compound having the formula $$[(C_6H_5)_3P]_2Rh(O_2)Cl\cdot0.5CH_2Cl_2$$

5. A process for the preparation of the compound of claim 4, said process comprising reacting $$[(C_6H_5)_3P]_3RhCl$$

with oxygen, said process being carried out at a temperature within the range of from about 15 to about 35° C., and in the presence of dichloromethane.

References Cited

Baird et al.: Chem. Comm. 1966, pp. 129–30.
Wojcicki et al.: Am. Chem. Soc., Abstract of Papers of 141st Meeting, 1962, pp. 32M–33M.
Tsuji et al.: J. Am. Chem. Soc., 88 (1966), pp. 3452–3.
Rusina et al.: Nature, 206 (1965), pp. 295–6.

TOBIAS E. LEVOW, Primary Examiner

A. P. DEMERS, Assistant Examiner

U.S. Cl. X.R.

117—107, 124; 252—429, 431; 260—530, 659, 668, 676

PO-1050
(5/69)

UNITED STATES PATENT OFFICE
CERTIFICATE OF CORRECTION

Patent No. 3,459,780      Dated August 5, 1969

Inventor(s) Geoffrey Wilkinson

It is certified that error appears in the above-identified patent and that said Letters Patent are hereby corrected as shown below:

Column 2, between lines 40 and 41, insert -- Example 1 --.
Column 4, lines 25-30, after right-hand closing bracket delete "1" and delete "XX" and replace with -- $XX_1$ --; line 68, for "halongen" read -- halogen, --; line 69, after "$R_5$" insert -- are --. Column 5, line 47, for "dodecryl" read -- dodecyl Column 8, line 15, for "$/(R_3Z\ /$" read -- $/(R_3Z)/$ --; line 45, for "$(R_3Z)RhCH1X$" read -- $(R_3Z)RhHClX$ --. Column 9, line 29 (Compound XII) for "$R'/$" read -- $R'/$ --. Column 10, line 4 (Claim 3, line 6) for "$(R_2Z)_2$" read -- $(R_3Z)_2$ --.

SIGNED AND
SEALED
APR 14 1970

(SEAL)
Attest:

Edward M. Fletcher, Jr.
Attesting Officer

WILLIAM E. SCHUYLER, JR.
Commissioner of Patents